US009042660B2

(12) United States Patent
Naito et al.

(10) Patent No.: US 9,042,660 B2
(45) Date of Patent: May 26, 2015

(54) INFORMATION PROCESSING APPARATUS AND INFORMATION PROCESSING METHOD

(71) Applicant: TOSHIBA TEC KABUSHIKI KAISHA, Shinagawa-ku, Tokyo (JP)

(72) Inventors: Hidehiro Naito, Shizuoka-ken (JP); Hiroshi Sugasawa, Miyagi-ken (JP); Hitoshi Iizaka, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/655,606

(22) Filed: Oct. 19, 2012

(65) Prior Publication Data

US 2013/0101168 A1 Apr. 25, 2013

(30) Foreign Application Priority Data

Oct. 19, 2011 (JP) ................................ 2011-230000

(51) Int. Cl.
*H04N 5/225* (2006.01)
*G07G 1/00* (2006.01)
*G07G 1/14* (2006.01)

(52) U.S. Cl.
CPC .............. *G07G 1/0063* (2013.01); *G07G 1/145* (2013.01)

(58) Field of Classification Search
None
See application file for complete search history.

(56) References Cited

U.S. PATENT DOCUMENTS 5,546,475 A * 8/1996 Bolle et al. .................... 382/190
7,382,939 B2 6/2008 Kanatsu
7,639,899 B2 12/2009 Igarashi et al.
8,074,881 B2 12/2011 Kurihara et al.
8,113,427 B2 2/2012 Ross et al.
2001/0041006 A1* 11/2001 Katsuyama ................... 382/190
2002/0194074 A1* 12/2002 Jacobs ............................ 705/16
2009/0279867 A1* 11/2009 Hamada et al. ................. 386/96
2010/0329562 A1* 12/2010 Zhu ............................... 382/187

(Continued)

FOREIGN PATENT DOCUMENTS

CN 101499200 8/2009
CN 102129748 7/2011

(Continued)

OTHER PUBLICATIONS

Nagano, "Checkout AI uses camera to tell your apples apart," New Scientist, Issue 2797, Feb. 4, 2011; [Retrieved from internet: Sep. 4, 2014].*

(Continued)

*Primary Examiner* — Sumati Lefkowitz
*Assistant Examiner* — Thomas A James
(74) *Attorney, Agent, or Firm* — Amin, Turocy & Watson, LLP

(57) ABSTRACT

According to one embodiment, an information processing apparatus includes an acquirement unit and a reporting unit. The acquirement unit is configured to acquire an image captured by a image capturing section. In a situation that a similarity representing a degree with which the image of an object captured by the image capturing section is similar to the reference image of each commodity meets a condition of determining a captured commodity as one commodity in the commodities corresponding to the reference image, the reporting unit is configured to report a situation that the captured commodity is determined as the commodity meeting the condition and corresponding to the reference image.

7 Claims, 12 Drawing Sheets

(56) References Cited

U.S. PATENT DOCUMENTS

| | | | | |
|---|---|---|---|---|
| 2011/0063465 | A1 * | 3/2011 | Nanu et al. | 348/222.1 |
| 2011/0131105 | A1 | 6/2011 | Aonuma et al. | |
| 2013/0054397 | A1 | 2/2013 | Nakatake et al. | |
| 2013/0057692 | A1 | 3/2013 | Naito et al. | |

FOREIGN PATENT DOCUMENTS

| | | |
|---|---|---|
| JP | 08-227480 | 9/1996 |
| JP | 2001-229382 | 8/2001 |
| JP | 2001-265811 | 9/2001 |
| JP | 2003-173369 | 6/2003 |
| JP | 2004-334338 | 11/2004 |
| JP | 2005-267609 | 9/2005 |
| JP | 2010-145391 | 7/2010 |
| JP | 2010-198137 | 9/2010 |

OTHER PUBLICATIONS

Yanai, The Current State and Future Directions on Generic Object Recognition, Department of Computer Science, The University of Electro-Communications, Nov. 2007.

Shotton et al, Semantic Texton Forests for Image Categorization and Segmentation, 2008.

Office Action of Notice of Rejection for Japanese Patent Application No. 2014-084906 Dated Jan. 27, 2015, 4 pages.

Office Action of Decision of a Patent Grant for Japanese Patent Application No. 2014-084905 Dated Jan. 27, 2015, 4 pages.

Office Action for Chinese Patent Application No. 201210398669.1 Dated Jan. 6, 2015, 9 pages.

* cited by examiner

F1

| COMMODITY ID | COMMODITY CLASSIFICATION | COMMODITY NAME | UNIT PRICE | COMMODITY IMAGE | ILLUSTRATION IMAGE |
|---|---|---|---|---|---|
| XXXXXXXX | VEGETABLE | CARROT | 100YEN |  |  G3 |
| ...... | ...... | ...... | ...... | ...... | ...... |

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2011-230000, filed Oct. 19, 2011, the entire contents of which are incorporated herein by reference.

FIELD

Embodiments described herein relate to an information processing apparatus and an information processing method.

BACKGROUND

Formerly, a technology to which generic object recognition related existed. In the generic object recognition, the characteristic quantity of a target was extracted from the image data of a captured article, and the characteristic quantity of the target was compared with previously prepared check data (characteristic quantity), so as to recognize (detect) the category and the like of the article. In addition, a store system which used the technology to which the generic object recognition related for the recognition of a commodity such as a fruit, a vegetable and the like to carry out sales registration on the recognized commodity was provided.

DETAILED DESCRIPTION

According to one embodiment, an information processing apparatus includes a first display control unit, a first output unit, a second display control unit, a selection acceptance unit, a second output unit. The first display control unit configured to display an image captured by an image capturing section. The first output unit configured to determine a commodity of a reference image whose the value representing a degree with which the image of the commodity captured by the image capturing section is similar to the reference image of each commodity is more than or equal to a first threshold value as the captured commodity and output commodity recognition information corresponding to the commodity of the reference image. The second display control unit configured to display the commodity of the reference image whose value is less than the first threshold value as a candidate of the captured commodity. The selection acceptance unit configured to accept the selection of one commodity from the candidate. The second output unit configured to determine the selected commodity as the captured commodity and output the commodity recognition information of the commodity in the situation that the selection acceptance unit accepts the selection.

Figure 1:
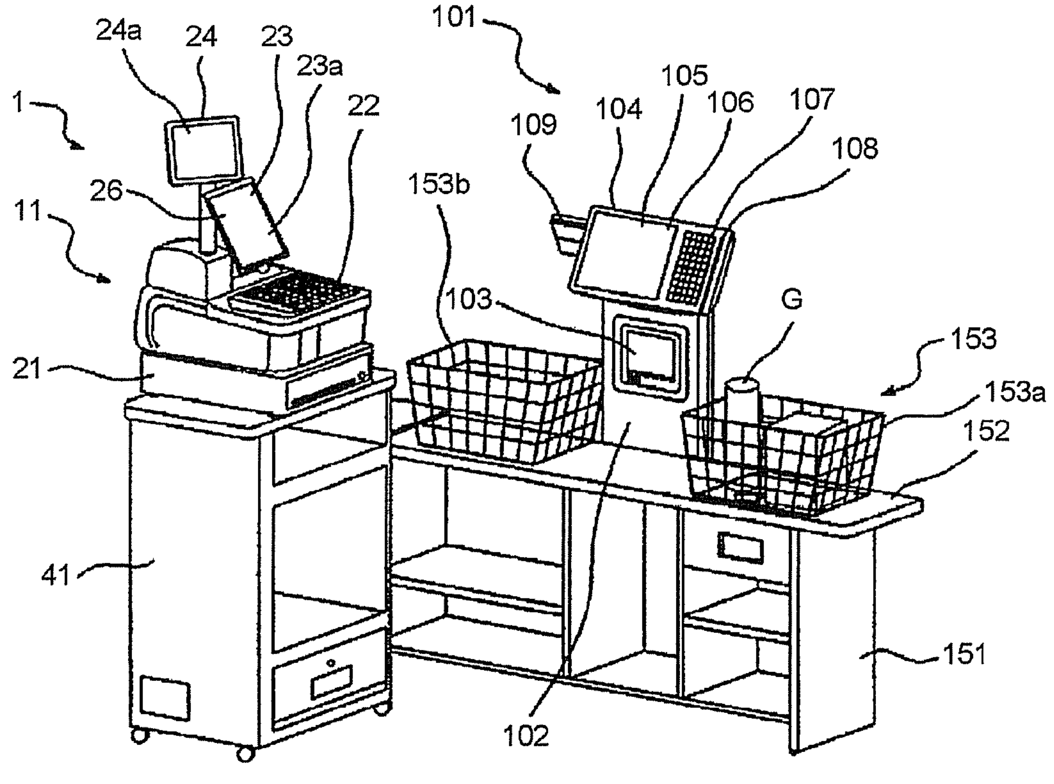
FIG. 1 is a perspective view showing an example of a checkout system (store system) to which an embodiment relates.

FIG. 1 is a perspective view showing an example of a checkout system 1. As shown in FIG. 1, the checkout system 1 comprises: a commodity reading apparatus 101 reading information in associate with the commodity, and a POS terminal 11 carrying out the registration and the settlement of the commodity to which one transaction relates. Hereinafter, the example that the commodity reading apparatus 101 is applied as the information processing apparatus to which the present embodiment relates is described. In addition, hereinafter, same components shown in a plurality of drawings are marked with same symbols to carry out showing, and their repeated descriptions are omitted sometimes.

The POS terminal 11 is placed on the upper surface of a cash drawer 21 on a checkout counter 41. The open operation of the cash drawer 21 is controlled by the POS terminal 11. The upper surface of the POS terminal 11 is equipped with a keyboard 22 pressed down by an operator (salesclerk). Observed from the side of the operator operating the keyboard 22, a display 23 for displaying the information towards operator is arranged at a position more backside than the keyboard 22 from the operator who operates the keyboard 22. The display 23 displays information on a display surface 23*a*. A touch panel 26 is laminated on the display surface 23*a*. A rotatable display for customer 24 that is vertically arranged at a position more backside than the display 23. The display for customer 24 displays information on the display surface 24*a*. In addition, the display surface 24*a* of the display for customer 24 shown in FIG. 1 faces the front side in FIG. 1, however, by rotating the display for customer 24, the display 24*a* may also face the back side in FIG. 1 to enable the display 24 to show information to a customer. A counter 151 having a wide-width is arranged to form an L shape with the checkout counter 41 on which the POS terminal 11 is placed. A placing surface 152 is formed on the upper surface of the counter 151. A shopping basket 153 containing a commodity G is placed on the placing surface 152. The shopping basket 153 can be distinguished in use to a first shopping basket 153*a* brought by a customer and a second shopping basket 153*b* placed at a position opposite to the first shopping basket 153*a* via the commodity reading apparatus 101. In addition, the shopping basket 153 is not limited in shape to an ordinary basket and also can be a tray in a bakery and the like. In addition, the shopping basket 153 (the second shopping basket 153*b*) is not limited in shape to an ordinary basket and also can be box-shaped or bag-shaped and the like.

The commodity reading apparatus 101, which is connected with the POS terminal 11 to transmit data with the POS terminal 11, is arranged on the placing surface 152 of the counter 151. The commodity reading apparatus 101 comprises a rectangular housing 102 having a relatively thin length. A reading window 103 is arranged at the front side of the housing 102. A display and operation section 104 is mounted on the upper portion of the housing 102. A display 106 is arranged on the display and operation section 104, and a touch panel 105 is laminated on the surface of the display 106. A keyboard 107 is arranged at the right side of the display 106. A card reading slot 108 of a card reader which is not shown in figures is arranged on the right side of the keyboard 107. A display for customer 109 used for providing information for the customer is arranged at the left side and behind of the display and operation section 104 at a position at which the operator operates the display and operation section 104.

The commodity reading apparatus 101 comprises a commodity reading section 110 (refer to FIG. 2), in which an image capturing unit 164 (refer to FIG. 2) are arranged behind of the reading window 103.

The commodities G to be settled in one transaction are accommodated in the first shopping basket 153*a* held by the customer. The commodities G in the first shopping basket 153*a* is moved to the second shopping basket 153*b* by the operator operating the commodity reading apparatus 101. In the movement process, the commodities G faces to the reading window 103 of the commodity reading apparatus 101. At the moment, the image capturing unit 164 (refer to FIG. 2) behind the reading window 103 shoots the commodity G.

In the commodity reading apparatus 101, a picture used for appointing the commodity registered in the following PLU file F1 (refer to FIG. 3) and corresponding to the commodity G included in the image captured by the image capturing unit 164 is displayed on the display and operation section 104, and the commodity ID of the appointed commodity is notified to the POS terminal 11. In the POS terminal 11, the information relating to sales registration, such as the commodity classification, the commodity name, the unit price and the like of the commodity corresponding to the commodity ID, is recorded in a sales master file (not shown in the figures) and the like to carry out the sales registration based on the commodity ID notified by the commodity reading apparatus 101.

Figure 2:
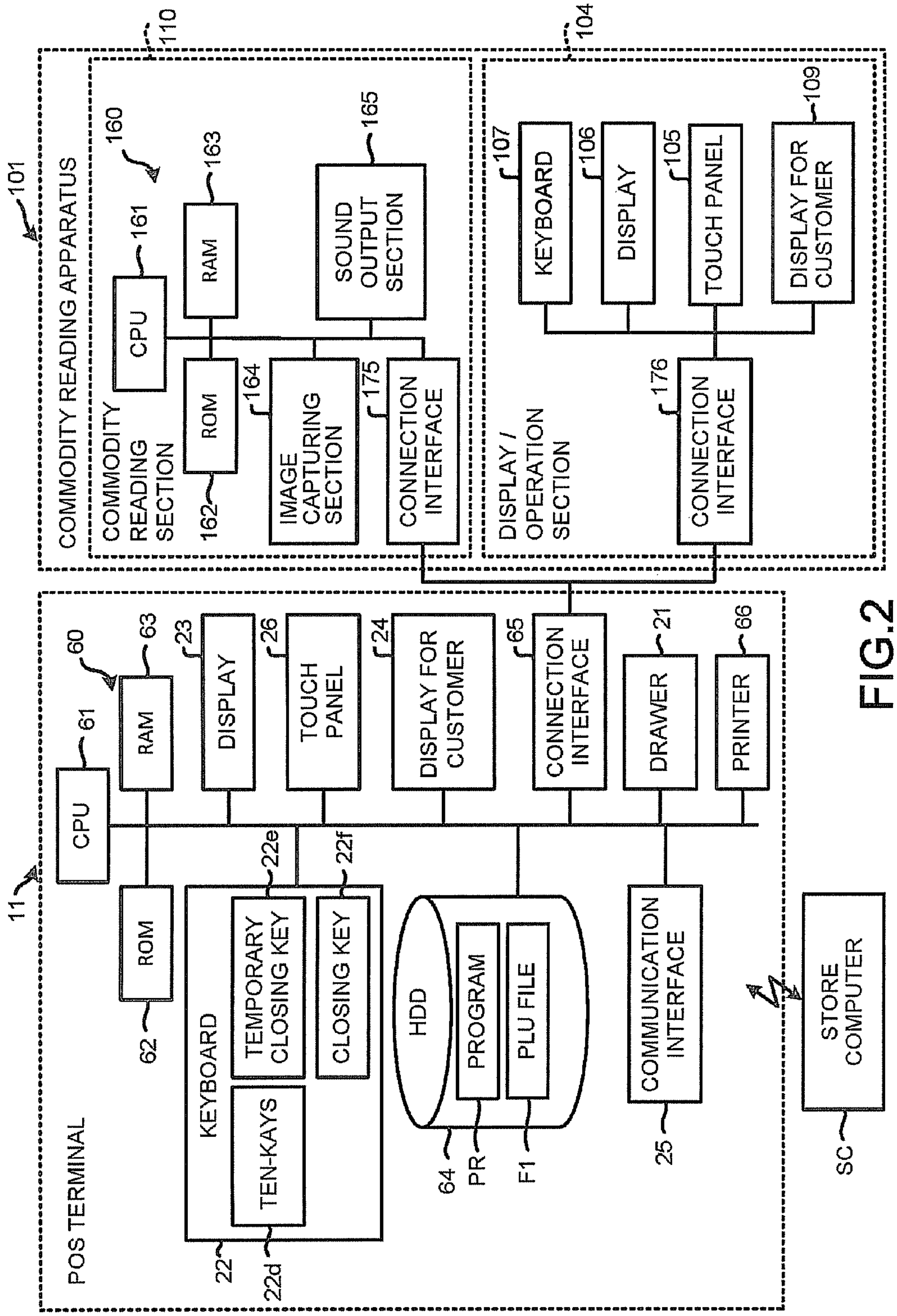
FIG. 2 is a block diagram showing hardware components of a POS terminal and a commodity reading apparatus.

FIG. 2 is a block diagram showing hardware components of the POS terminal 11 and the commodity reading apparatus. The POS terminal 11 comprises a microcomputer 60 which function as an information processing section to execute information processing. The microcomputer 60 includes a CPU (Central Processing Unit) 61 for execute various operations to control each other unit, a ROM (Read Only Memory) 62 and a RAM (Random Access Memory) 63 which are respectively connected to the CPU via a bus line.

The cash drawer 21, the keyboard 22, the display 23, the touch panel 26 and the display for customer 24 are all connected with the CPU 61 of the POS terminal 11 through various input and output circuits (all not shown in the figures). These apparatuses are controlled by the CPU 61.

The keyboard 22 comprises numerical keypad 22*d* on the upper surface of which numerals "1", "2", "3" . . . and operates such as "x" are displayed, a temporary closing key 22*e* and a closing key 22*f*.

The CPU 61 of the POS terminal 11 is connected with an HDD (Hard Disk Drive) 64 in which programs and various files are stored. The programs and the various files stored in the HDD 64 are wholly or partially copied to the RAM 63 to be sequentially executed by the CPU 61 when the POS terminal 11 is activated. An example of the programs stored in the HDD 64 is a program PR for processing commodity sales data. An example of the files stored in the HDD 64 is the PLU file F1 which is transmitted from a store computer SC to the POS terminal and then stored in the HDD 64.

The PLU file F1 is a commodity file in which the sales registration information of each of the commodity G exhibited and sold in a shop is associated with the image of the commodity G.

Figure 3:
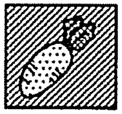
FIG. 3 is a conceptual graph exemplifying data structure of a PLU file.
Figure 3:

FIG. 3 is a conceptual graph exemplifying data structure of the PLU file F1. As shown in FIG. 3, the PLU file F1 is a file which stores the information in associate with the commodity, such as the commodity ID uniquely assigned, the commodity classification to which the commodity G belongs, the commodity name, the unit price and the like, a commodity image (reference image) obtained by capturing the image of the commodity and the illustration image representing the commodity as the commodity information of the commodity G for each commodity G. In addition, the commodity image is the captured image (photo) of the commodity used for similarity determine. In addition, the PLU file F1 is formed to be a file being capable of being read out by the commodity reading apparatus 101 via the following connection interface 65.

In addition, the data structure of the PLU file F1 is not limited to the example in FIG. 3, for instance, the data structure also can be set to be the form that a characteristic quantity such as a hue or a surface concave-convex status and the like read from the commodity image is stored for each commodity.

Referring back to FIG. 2, a communication interface 25 used for performing a data communication with the store computer SC is connected with the CPU 61 of the POS terminal 11 via an input and output circuit (not shown in the figures). The store computer SC is installed in the backyard of a store. The PLU file F1 to be sent to the POS terminal 11 is stored in the HDD (not shown in the figures) of the store computer Sc.

The CPU 61 of the POS terminal 11 is connected with the connection interface 65 which enables a data transmission/reception with the commodity reading apparatus 101. The connection interface 65 is connected with the commodity reading apparatus 101. In addition, the CPU 61 of the POS terminal 11 is connected with a printer 66 printing receipts. The POS terminal 11 prints the content of one transaction on the receipt under the control of the CPU 61.

The commodity reading apparatus 101 further comprises a microcomputer 160. The microcomputer 160 includes a CPU 161 connected with a ROM 162 and a RAM 163 via a bus line. The programs executed by the CPU 161 are stored in the ROM 162. The image capturing unit 164 and a sound output section 165 are connected with the CPU 161 via various input and output circuits (all not shown in the figures). The image capturing unit 164 and the sound output section 165 operate under the control of the CPU 161. The display and operation section 104 is connected with the commodity reading section 110 and the POS terminal 11 through a connection interface 176. The display and operation section 104 operates under the control of the CPU 161 of the commodity reading section 110 and the CPU 61 of the POS terminal 11.

The image capturing unit 164 is a camera CCD image sensor or a camera COMS image sensor and the like, and moreover, is the image capturing section carrying out capturing from the reading window 103 under the control of the CPU 161. For instance, the capturing of a 30 fps animation image is carried out in the image capturing unit 164. Frame images (captured images) captured in sequence by the image capturing unit 164 according to a specified frame per second are stored in the RAM 163.

The sound output section 165 consists of a sound circuit and a loudspeaker used for radiating a given warning sound.

The sound output section 165 informs events with the warning sound under the control of the CPU 161.

The CPU 161 is connected with a connection interface 175 which is connected with the connection interface 65 of the POS terminal 11 to transmit data with the POS terminal 11. In addition, the CPU 161 transmits the data with the display and operation section 104 via the connection interface 175.

Next, functional components of the CPU 161 and the CPU 61 realized by executing the program by the CPU 161 and the CPU 61 are described with reference to FIG. 4.

Figure 4:
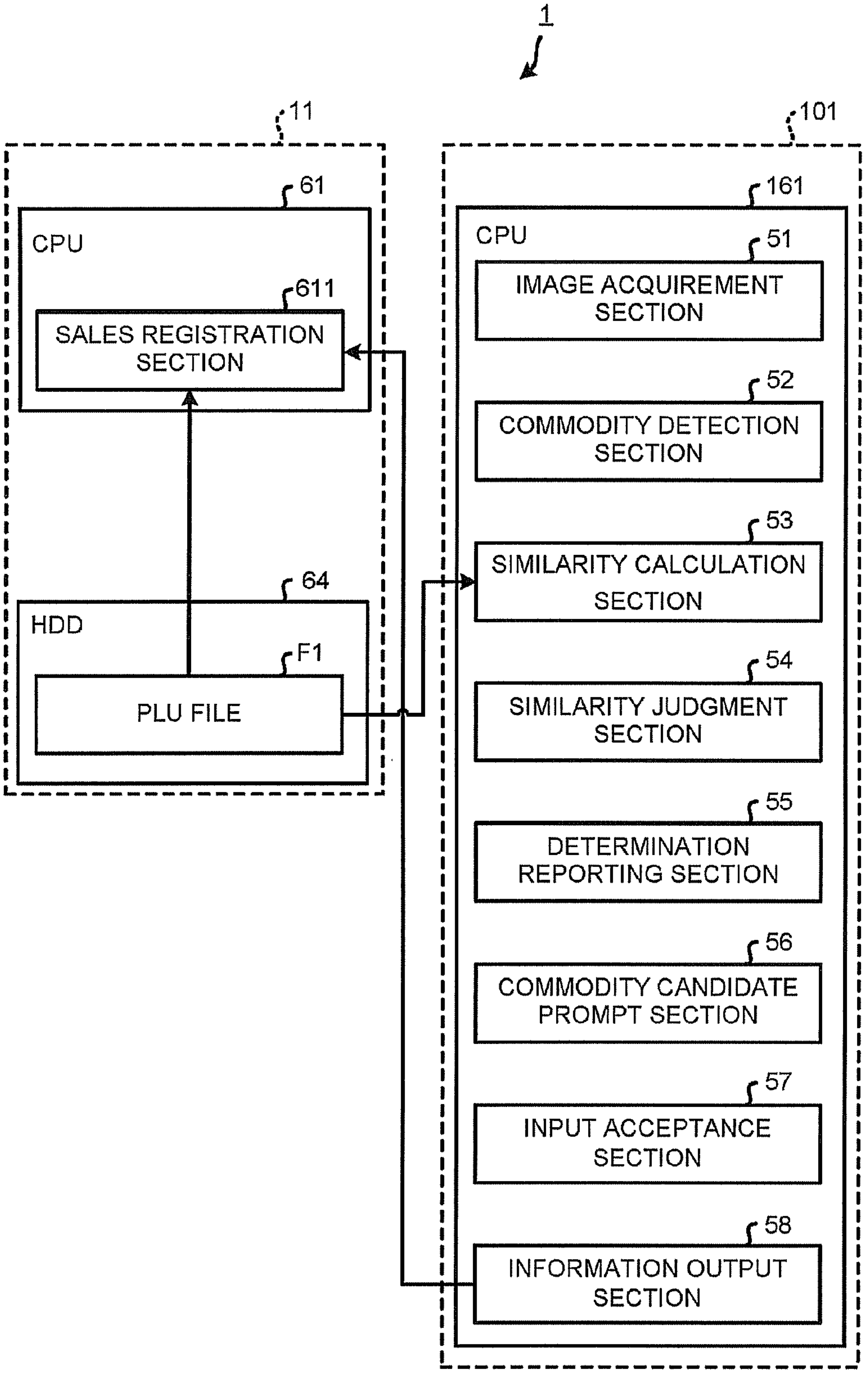
FIG. 4 is a block diagram showing functional components of the POS terminal and the commodity reading apparatus.

FIG. 4 is a block diagram showing the functional components of the POS terminal 11 and the commodity reading apparatus 101. As shown in FIG. 4, the CPU 161 of the commodity reading apparatus 101 comprises functions as an image acquirement section 51, a commodity detection section 52, a similarity calculation section 53, a similarity determination section 54, a determination reporting section 55, a commodity candidate prompt section 56, an input acceptance section 57 and an information output section 58 by executing the program stored by the ROM 162. In addition, similarly, the CPU 61 of the POS terminal 11 comprises a function as a sales registration section 611 by executing the program PR.

The image acquirement section 51 outputs a capturing-on signal to the image capturing unit 164, so that the image capturing unit 164 begins a capturing operation. The image acquirement section 51 acquires the frame images captured by the image capturing unit 164 and stored in the RAM 163 in sequence after the capturing operation begins. The acquirement of the frame images, which is executed by the image acquirement section 51, is carried out according to a sequence stored in the RAM 163.

Figure 5:
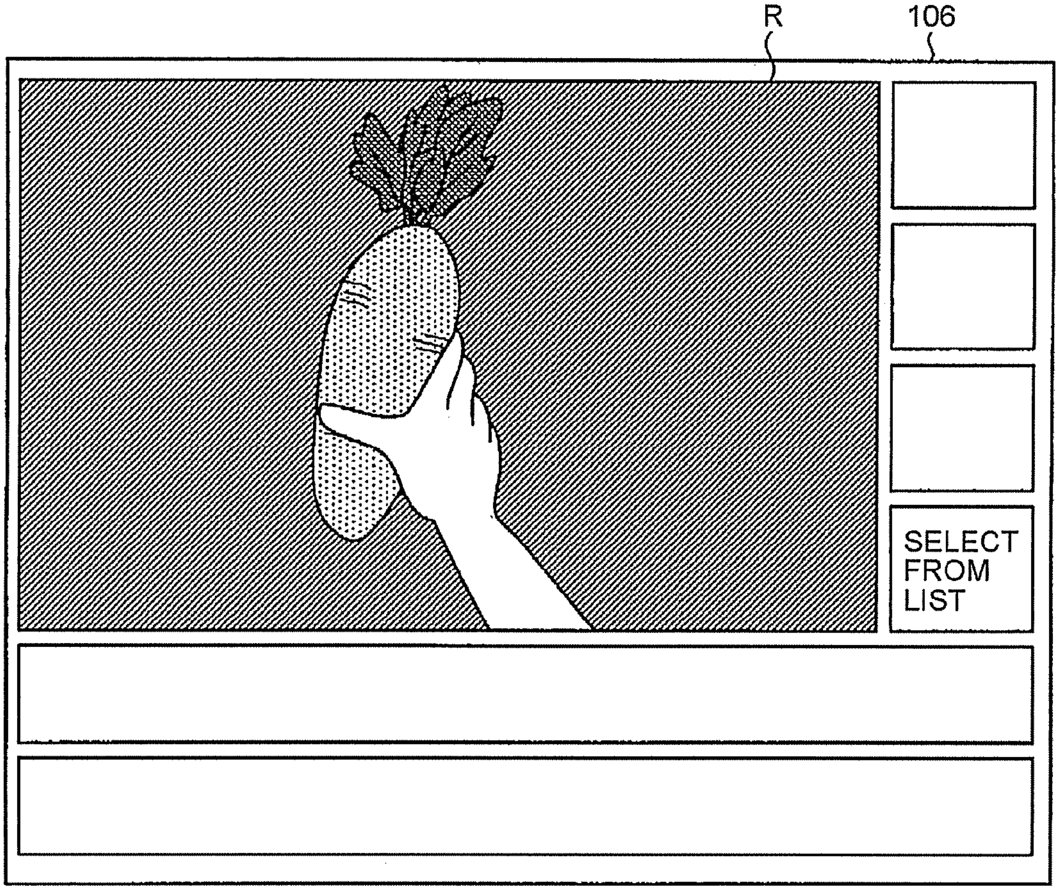
FIG. 5 is a drawing showing an example of a frame image acquired by an image acquirement section.

FIG. 5 is a drawing showing an example of a frame image R acquired by the image acquirement section 51. As shown in FIG. 5, when the operator covers the reading window 103 with the commodity G, all or part of the commodities G are captured in a reading region R of the image capturing unit 164.

The commodity detection section 52 detects all or part of the commodities G included in the frame image acquired by the image acquirement section 51 by utilizing a pattern matching technology and the like. Particularly, contour lines and the like are extracted from images obtained after carrying out binaryzation on the acquired frame images. Next, the contour line extracted from a last frame image is compared with the contour line extracted from a current frame image, so as to detect the commodity which is enabled to face to the reading window 103 for the sales registration.

As other method detecting the commodity, the existence of a skin color region is detected from the acquired frame image. Next, if the skin color region is detected, that is, if the hand of the salesclerk is detected, the operation of the contour of the commodity supposed to be held by the hand of the salesclerk is tried by carrying out the detection of the contour line near the skin color region. At the moment, if a contour representing the shape of the hand and the contour of other object near the contour of the hand are detected, the commodity is detected according to the contour of the object.

The similarity calculation section 53 reads a surface state such as the hue or the surface concave-convex status and the like of the commodities G from all or part of the images of the commodities G captured by the image capturing unit 164 as the characteristic quantity. In addition, in order to shorten processing time, the similarity calculation section 53 will not consider the contour or the size of the commodity G.

The similarity calculation section 53 reads the surface state such as the hue or the surface concave-convex status and the like of a registered commodity from the commodity image of each commodity (hereinafter, called as registered commodity) registered in the FLU file F1 as the characteristic quantity, and compares the characteristic quantity with the characteristic quantity of the commodity G respectively, so as to calculate a similarity of the commodity G and the commodity registered in the FLU file F1. Herein, the similarity represents the degree with which all or part of the images of the commodity G are similar in the situation that the commodity image of each commodity stored in the FLU file F1 is set to be 100%="similarity: 1.0". In addition, for instance, for the hue and the surface concave-convex status, the similarity also can be calculated by changing a weight.

The recognition of the object included in the image in this way is called as generic object recognition. For such generic object recognition, various recognition technologies are described in the following literature.

Yanai Keiji, "present state and perspectives of generic object recognition", collected papers of information processing society, Vol. 48, No.SIG16 [retrieved on August 10, Heisei 22 (2010)], website <URL: http://mm.cs.uec.ac.jp/IPSJ-TCVIM-Yanai.pdf>.

A technology carrying out the generic object recognition by carrying out region segmentation on the image aiming at each target is described in the following literature.

Jamie Shotton and the like, "Semantic Texton Forests for Image Categorization and Segmentation", [retrieved on August 10, Heisei 22 (2010)], website <URL: http://citeseerx.ist.psu.edu/viewdoc/download?doi=10.1.1.145.3036&rep=rep1&type=pdf>.

In addition, a calculation method for the similarity of the image of the captured commodity G and the commodity image of the registered commodity registered in the PLU file F1 is not particularly limited. For instance, the similarity of the image of the captured commodity G and each registered commodity registered in the PLU file F1 can be calculated as absolute evaluation and also can be calculated as relative evaluation.

In the situation that the similarity is calculated as the absolute evaluation, the image of the captured commodity G is compared with each registered commodity registered in the PLU file F1 one to one, and the similarity educed from a comparison result is directly adopted. In addition, in the situation that the similarity is calculated as the relative evaluation, if five registered commodities (commodities GA, GB, GC, GD and GE) are registered in the PLU file F1, the calculation is carried out in the way of enabling the similarity of the captured commodity G and the commodity GA to be 0.6, the similarity of the captured commodity G and the commodity GB to be 0.1, similarity of the captured commodity G and the commodity GC to be 0.1, similarity of the captured commodity G and the commodity GD to be 0.1, the similarity of the captured commodity G and the commodity GE to be 0.1, and the like and the sum of the similarity of the captured commodity G to each registered commodity to be 1.0 (100%)

The similarity determination section 54 compares the similarity of the image of the commodity G with the commodity image registered in the PLU file F1 for each frame image acquired by the image acquirement section 51. In the present embodiment, a plurality of conditions are set step by step for the similarity of the commodity image of the registered commodity and the image of the commodity G, and the similarity determination section 54 carries out the determination of the registered commodity or the selection of the candidate of the commodity according to the met condition. The conditions in associate with the similarity are not particularly limited, but the situation of using conditions a-c is described hereinafter.

Herein, the condition a and the condition b are first conditions to which the present embodiment relates, and moreover, are the conditions used for determining the commodity G captured by the image capturing unit 164 as one commodity in the registered commodity registered in the PLU file F1. In addition, the condition c is a second condition to which the present embodiment relates, and moreover, is the condition used for extracting the candidate of the commodity G captured by the image capturing unit 164 from the registered commodity registered in the PLU file F1.

The similarity determination section 54 judges (determines) the registered commodity meeting the condition a or the condition b as the commodity (hereinafter, called as determined commodity) corresponding to the commodity G captured by the image capturing unit 164 one to one. In addition, the similarity determination section 54 determines the registered commodity meeting the condition c as the candidate (hereinafter, called as commodity candidate) of the commodity G captured by the image capturing unit 164 rather than determines the commodity. Afterwards, the commodity candidate for the commodity G is extracted by extracting the registered commodity meeting the condition c from a plurality of registered commodities registered in the PLU file F1.

The details of the conditions a-c are not particularly limited, the conditions a-c can be set step by step according to the similarity, and as an example, the conditions a-c can be set by a plurality of preset threshold valves. Herein, the situation that the conditions a-c are set by a first threshold value to a third threshold value is described. In addition, the size relationship of the first threshold value to the third threshold value is set to be that a second threshold value is less than the first threshold value but more than the third threshold value.

The similarity determination section 54 counts a time of determinations that the similarity of the commodity and the registered commodity is determined to be above the preset first threshold value (such as 90%) and determines that the condition a is met in the situation that the time of determinations is more than or equal to a given time. In addition, in the situation that the first threshold value is adequately highly set, so that an erroneous determine cannot occur, the given time also can be set to be one to determine the condition a.

In the situation that the similarity of the commodity and the registered commodity is less than the first threshold value (such as 90%) and is further more than or equal to the second threshold value (such as 75%) less than the first threshold value, the similarity determination section 54 determines that the condition b is met. Afterwards, even though the registered commodity meeting the condition b is the determined commodity, a confirmation operation needing to be carried out by the operator is determined. In addition, a time of determinations that the similarity of the commodity and the registered commodity is determined to be less than the first threshold value (such as 90%) and be further more than or equal to the second threshold value (such as 75%) less than the first threshold value also can be counted, and in the situation that the time of determinations is more than or equal to a specified time, the condition b is determined to be met.

In the situation that the similarity of the commodity and the registered commodity is less than the second threshold value (such as 75%) and is further more than or equal to the third threshold value (such as 10%) less than the second threshold value, the similarity determination section 54 determines that the condition c is met. In addition, furthermore, a time of determinations that the similarity of the commodity and the registered commodity is determined to be less than the second threshold value (such as 75%) and be further more than or equal to the third threshold value (such as 10%) less than the second threshold value also can be counted, and in the situation that the time of determinations is more than or equal to the specified time, the condition c is that determines to be met.

All the conditions a-c can be properly set according to the size of the similarity, the time of determinations and the like, but are not limited to the above example. In addition, for the specified time used for determining of the conditions a-c, different times also can be respectively set for each condition.

The determination reporting section 55 reports that the commodity captured by using the image capturing unit 164 is uniquely determined as the registered commodity meeting the condition a or the condition b to the operator or the customer by image output or sound output and the like.

More particularly, the determination reporting section 55 (the first display control unit) displays a determination screen 71 (refer to FIG. 6) representing that the registered commodity meeting the condition is a uniquely determined as the commodity (determined commodity) captured by using the image capturing unit 164 on the display 106.

Figure 6:
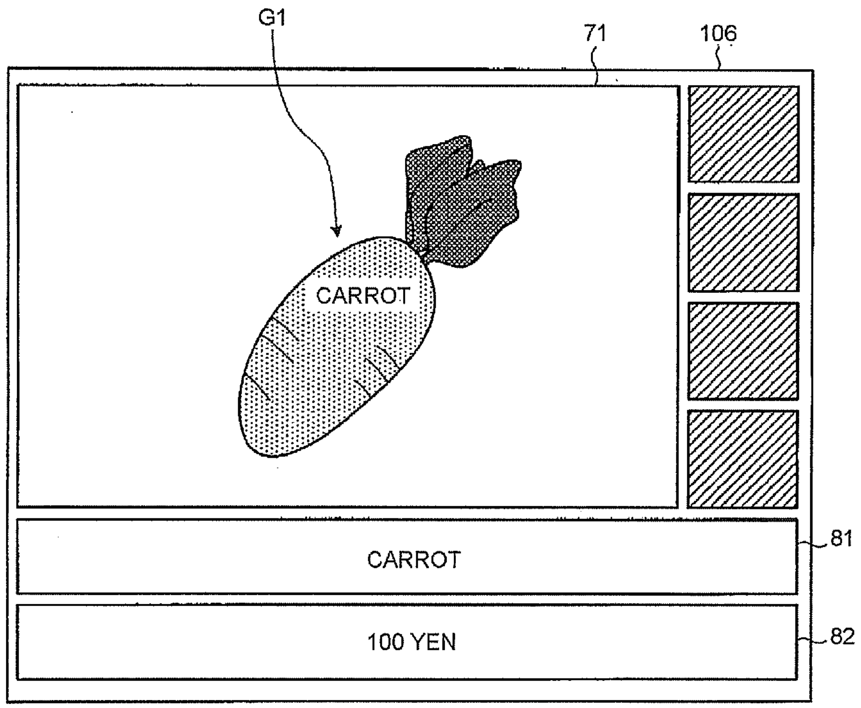
FIG. 6 is a drawing showing an example of a determination screen.

FIG. 6 is a drawing showing an example of the determination screen 71. In the situation that the registered commodity meeting the condition a exists, the determination reporting section 55 stops the display of the captured image in the reading region R (refer to FIG. 5), reads out a illustration image G1 corresponding to the determined commodity and the commodity name "carrot" from the PLU file F1, and displays them on the determination screen 71. In addition, the determination reporting section 55 respectively displays the commodity name and the commodity price (unit price) of the determined commodity read out from the PLU file F1 on a commodity name display region 81 and a price display region 82. In addition, the determination reporting section 55 also can replace the display of the illustration image G1 to display the commodity image (photo) read out from the PLU file F1.

The determination reporting section 55 coordinates with an occasion of the display of the determination screen 71 and outputs the commodity name and the like read out from the PLU file F1 and the information in associate with the determined commodity to the sound output section 165. The sound output section 165 reports the information representing the determined commodity to the operator or the customer by outputting the input information.

The determination reporting section 55 displays a confirmation screen 72 (refer to FIG. 7) accepting a final confirmation operation whether or not the registered commodity (determined commodity) meeting the condition b is the commodity G captured by the image capturing unit 164 on the display 106.

Figure 7:
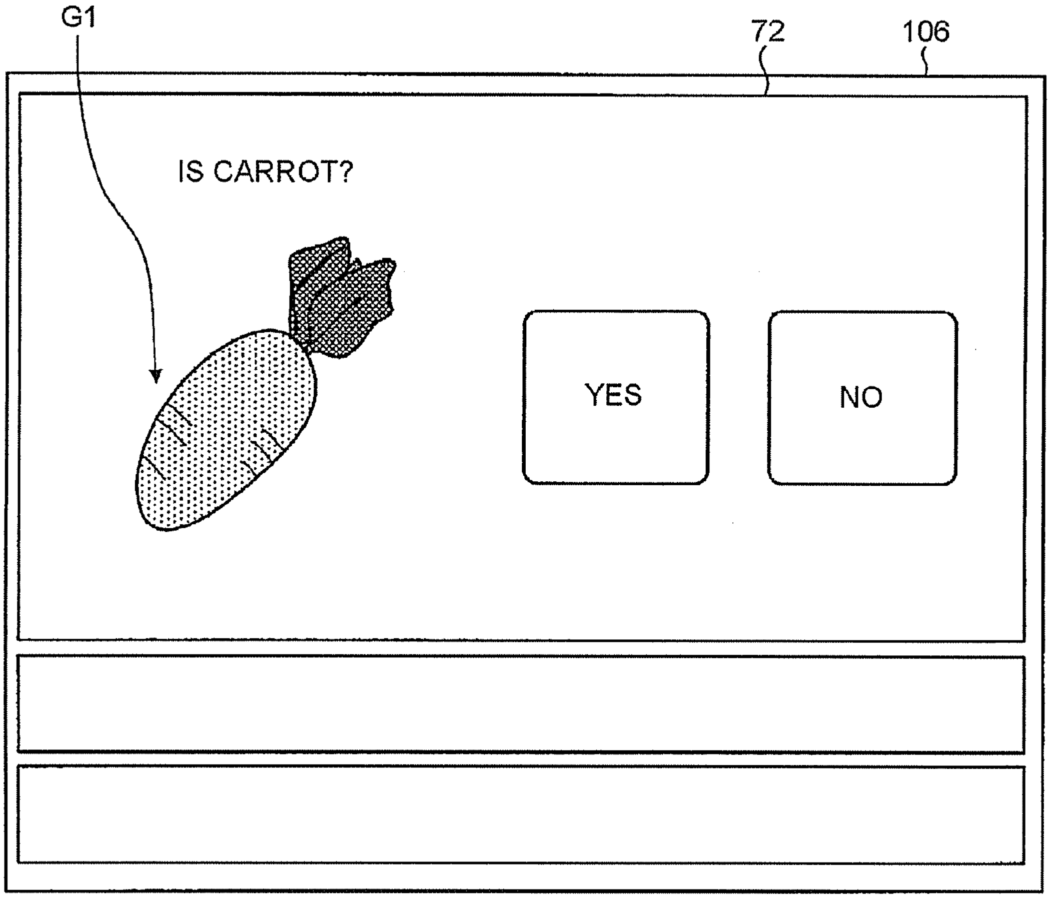
FIG. 7 is a drawing showing an example of the confirmation screen.

FIG. 7 is a drawing showing an example of the confirmation screen 72. When the registered commodity meeting the condition b exists, the determination reporting section 55 reads out the illustration image G1 corresponding to the determined commodity from the PLU file F1 and displays it on the confirmation screen 72. In addition, the determination reporting section 55 displays information inquiring whether or not the read commodity G is the commodity of the illustration image G1 by using the commodity name of the determined commodity read out from the PLU file F1 as "is the carrot?" and the like. In addition, a button such as a "Yes/No" button and the like is selectively arranged on the confirmation screen 72 by a touch operation to the touch panel 105.

In this way, in the confirmation screen 72, the result of the similarity determination is that the commodity name or the commodity image of the registered commodity (determined commodity) which is uniquely selected for one commodity G is shown, and moreover, the commodity G and the registered commodity are maintained to be a one-to-one relationship and are displayed. Therefore, the confirmation screen 72 is a screen reporting that the registered commodity meeting the condition b is uniquely determined as the commodity G captured by the image capturing unit 164.

In the present embodiment, in the situation that the commodity captured in such a way is uniquely determined, the display of the captured image is replaced to display the illustration image of the determined commodity. Therefore, the operator can recognize that the recognition of the commodity is determined by intuition, and moreover, can recognize the commodity which is recognized at a glance.

The determination reporting section 55 can cooperate with the occasion when the confirmation screen 72 is displayed, carries out the sound output on the information in associate with the determined commodity to the sound output section 165, and also cannot carry out the sound output in the confirmation screen 72. The existence of the sound output in the determination picture 71 and the confirmation screen 72 can be set properly.

The commodity candidate prompt section 56 (the second display control unit) displays the information in associate with the registered commodity meeting the condition c on the display 106 as the commodity candidate. More particularly, the commodity candidate prompt section 56 reads out the illustration image and the commodity name of the registered commodity meeting the condition c from the FLU file F1 and outputs the commodity with a high similarity calculated by the similarity calculation section 53 in sequence to the display 106. The display 106 displays the illustration image of the commodity candidate and the commodity name from the commodity with the high similarity in a commodity candidate prompt section 83 (refer to FIG. 8) in sequence.

Figure 8:
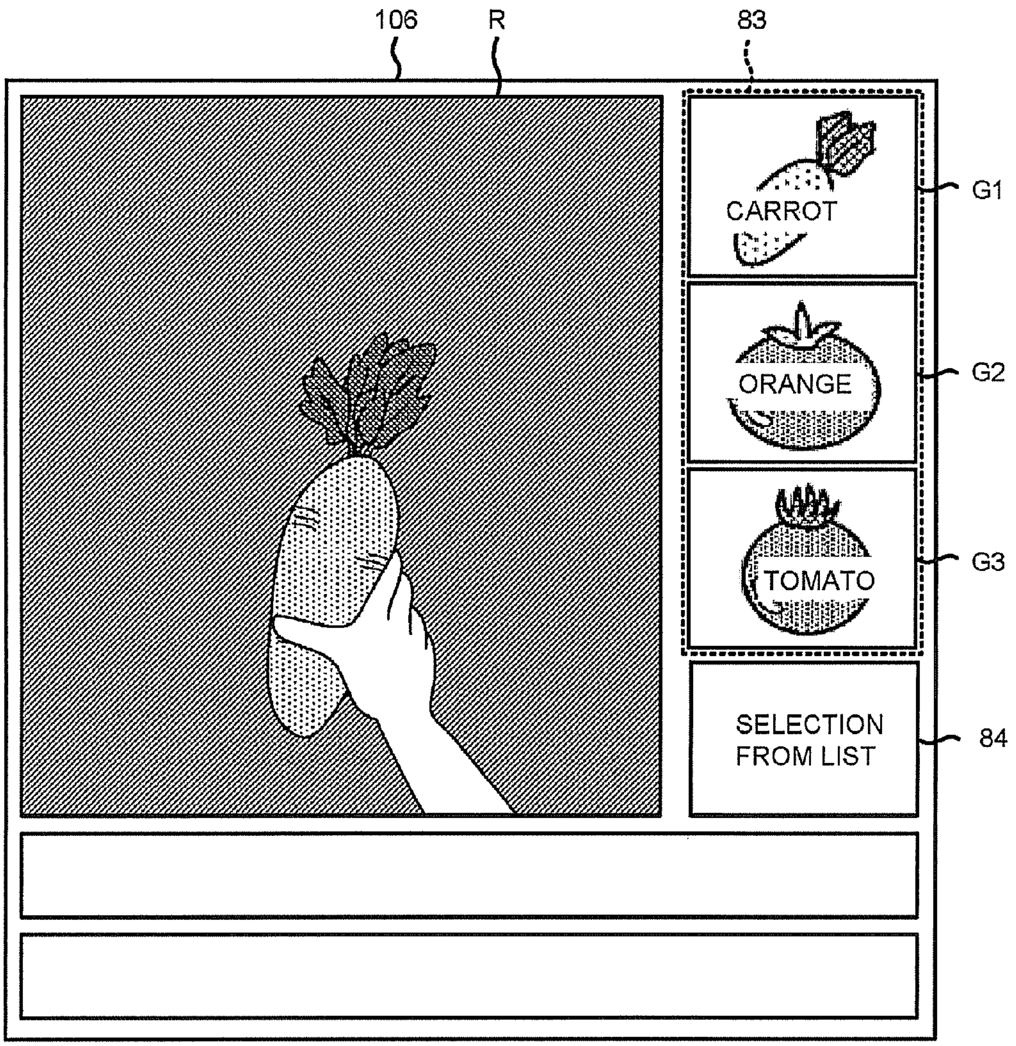
FIG. 8 is a drawing showing a picture example of an illustration image displaying a commodity candidate.

FIG. 8 is a drawing showing a picture example displaying illustration images G1, G2 and G3 of the commodity candidate. As shown in FIG. 8, the illustration images G1, G2 and G3 of the commodity candidate and each commodity name are displayed in the commodity candidate prompt region 83 in sequence from the registered commodity with the high similarity. These illustration images G1, G2 and G3 are formed to be selectable corresponding to a selection operation to the touch panel 105. In addition, a selection button 84 used for selecting the commodity from a commodity list is arranged at the lower part of the commodity candidate prompt region 83, and the commodity selected from the commodity list is processed as the above determined commodity. In addition, the example that three commodity candidates corresponding to the illustration images G1-G3 are displayed is shown in FIG. 8, but the quantity or the display method of the commodity candidate is not particularly limited. Moreover, the display of the illustration image also can be replaced to display the commodity image (photo).

Even though the illustration images G1-G3 of the commodity candidate are displayed on the display 106, in the situation that the selection operation to the commodity candidate is not accepted, the image acquirement processing executed by the image acquirement section 51, the detection processing executed by the commodity detection section 52 and the similarity calculation processing executed by the similarity calculation section 53 are continued. Therefore, during the period if the commodity candidate is not selected, the captured image of the reading region R is displayed on the picture of the display 106.

The input acceptance section 57 accepts various input operations corresponding to the display of the display 106 via the touch panel 105 or the keyboard 107. For instance, the input acceptance section 57 accepts the input operation (determination operation) of a content finally confirming the commodity of the displayed illustration image G1 is the determined commodity based on the selection operation to the determination screen 72 (refer to FIG. 7). In addition, the determination reporting section 55 displays the determination screen 71 on the display 106 in the situation that the input acceptance section 57 accepts the confirmation operation.

The input acceptance section 57 accepts the selection operation to any one illustration image in the illustration images G1-G3 (refer to FIG. 8) of the commodity candidate displayed on the display 106. The input acceptance section 57 accepts the registered commodity of the selected illustration image as the determined commodity aiming at the commodity G. In addition, in the situation that the commodity detection section 52 can detect a plurality of commodities G, the input acceptance section 57 also can accept the selection operation of a plurality of commodity candidates from the commodity candidates. In addition, the determination reporting section 55 displays the determination screen 71 displaying the accepted commodity candidate as the determined commodity on the display 106 in the situation that the input acceptance section 57 accepts the selection operation.

The information output section 58 outputs the information (such as the commodity ID or the commodity name and the like) representing the commodity to the POS terminal 11 through the connection interface 175 for the determined commodity determined in the above way.

The information output section 58 also can output a sales number additionally input by other way together with the commodity ID and the like to the POS terminal 11 via the touch panel 105 or the keyboard 107. In addition, as the information output to the POS terminal 11 by the information output section 58, the information output section 58 can directly notify the commodity ID read out from the PLU file F1, also can notify the commodity name or the commodity image capable of appointing the commodity ID and the file name of the illustration image, and also can notify the storage location (a storage address in the PLU file F1) of the commodity ID to the POS terminal 11.

The sales registration section 611 of the POS terminal 11 carries out the sales registration of the corresponding commodity based on the commodity ID and the sales number input from the information output section 58. Particularly, the sales registration section 611 records the notified commodity ID, the commodity classification, the commodity name, the unit price and the like corresponding to the commodity ID and the sales number together in the sales master file and the like by referring to the PLU file F1, so as to carry out the sales registration.

Figure 9:
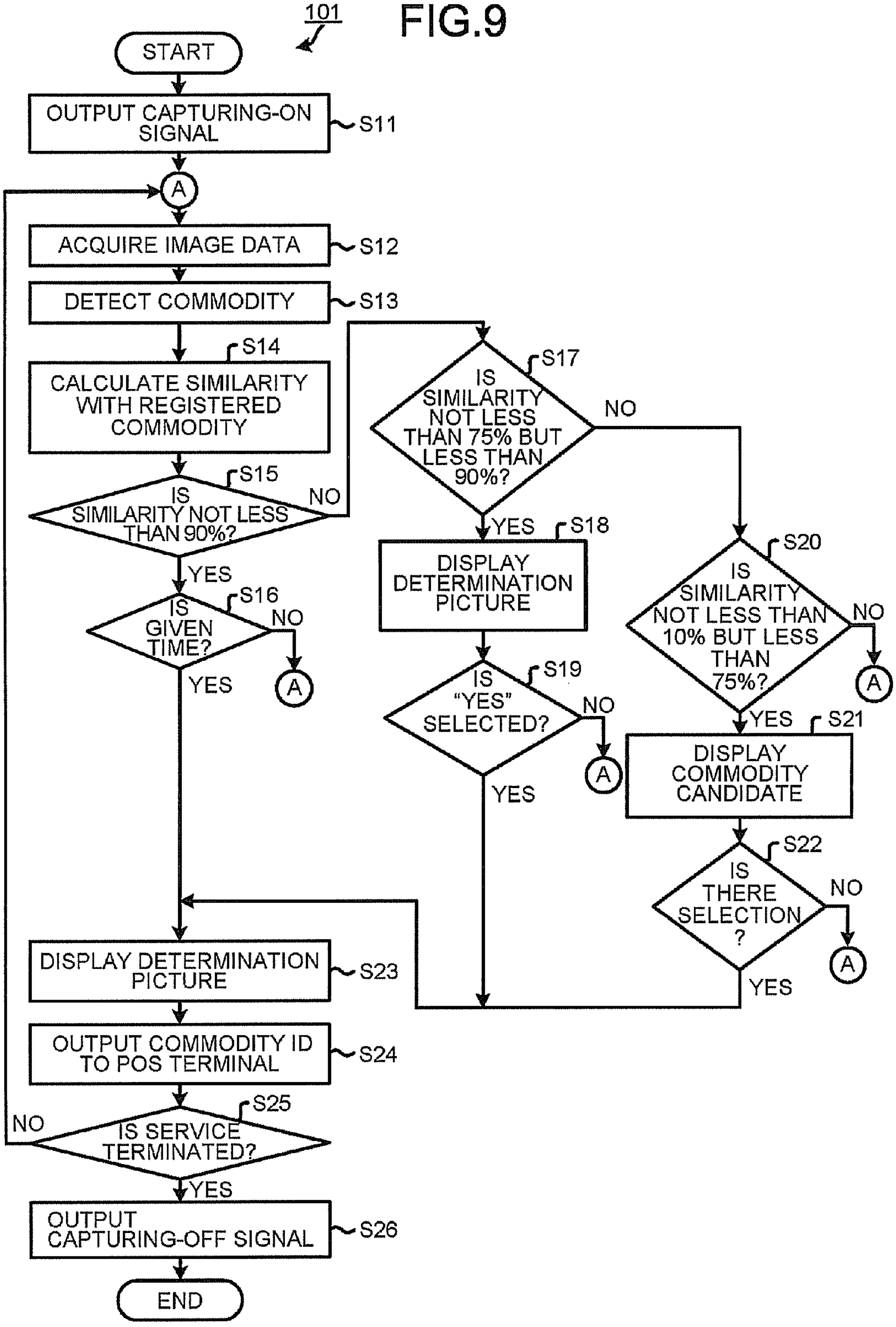
FIG. 9 is a flow chart showing the Acts of commodity recognition processing executed by the commodity reading apparatus.

The work of the checkout system 1 is described in detail. First, the work of the commodity reading apparatus 101 is described. FIG. 9 is a flow chart showing Acts of commodity recognition processing executed by the commodity reading apparatus 101. In FIG. 9, the situation that the first threshold value is set to be the similarity 90% (0.90), the second threshold value is set to be the similarity 75% (0.75) and the third threshold value is set to be the similarity 10% (0.10) is described, but each threshold value is not limited to that.

When the processing begins in response to the beginning and the like of the commodity registration executed by the POS terminal 11, the image acquirement section 51 outputs the on signal to the image capturing unit 164, so as to begin the capturing executed by the image capturing unit 164 (Act S11).

The image acquirement section 51 acquires the frame image (captured image) captured by the image capturing unit 164 and stored in the RAM 163 (Acts S12). Next, the commodity detection section 52 detects all or part of the commodities G in the frame image acquired by the image acquirement section 51 (Act S13). Subsequently, the similarity calculation section 53 reads the characteristic quantity of the commodities G from all or part of the images of the commodities G and compares the characteristic quantity with the characteristic quantity of each commodity image registered in the PLU file F1, so as to calculate the similarity with the registered commodity (Act S14).

The similarity determination section 54 determines whether or not the registered commodity whose similarity is more than or equal to 90% exists (Act S15). When the registered commodity whose similarity is more than or equal to 90% does not exist (Act S15: No), the processing is transferred to Act S17. If the registered commodity whose similarity is more than or equal to 90% exists (Act S15: Yes), the time of determinations that the similarity aiming at the same registered commodity is determined to be more than or equal to 90% is determines whether or not to be the specified time (such as 3 times) (Act S16) If the specified time is not reached (Act S16: No), the processing is returned to Act S12, and the image acquirement section 51 acquires a new frame image captured by the image capturing unit 164.

When the specified time is reached (Act S16: Yes), the determination reporting section 55 displays the determination screen 71 (refer to FIG. 6) including the illustration image of the determined commodity, and moreover, reports the determined commodity by carrying out sound notification on the commodity name of the determined commodity (Act S23). In addition, the information output section 58 outputs the commodity ID and the like of the registered commodity regarded as the determined commodity together with the sales number input in other way via the keyboard 107 to the POS terminal 11 (Act S24), and afterwards, transfers to the processing in Act S25.

In the situation that Act S15 is No, the similarity determination section 54 determines whether or not the registered commodity whose similarity is more than or equal to 75% but less than 90% exists (Act S17). When the registered commodity whose similarity is in the range exists (Act S17: Yes), the registered commodity is determined as the determined commodity needing the confirmation of the operator, and the confirmation screen 72 is displayed on the display 106 (Act S18). The input acceptance section 57 determines whether or not "Yes" is selected in the confirmation screen 72 (refer to FIG. 7) (Act S19). If "Yes" is selected (Act S19: Yes), the processing is transferred to Act S23, and the determination reporting section 55 displays the determination screen 71. On the other hand, if "No" is selected (Act S20: No), the processing is returned to Act S12.

If the registered commodity whose similarity is more than equal to 75% but less than 90% does not exist (Act S17: No), the similarity determination section 54 determines whether or not the registered commodity whose similarity is more than or equal to 10% but less than 75% exists and extracts the registered commodity whose similarity is in the range as the commodity candidate of the commodity G (Act S20). If the registered commodity in the range does not exist (Act S20: No), the processing is returned to Act S12. If the registered commodity whose similarity is more than or equal to 10% but less than 75% exists (Act S20: Yes), the similarity determination section 54 determines the registered commodity as the commodity candidate of the commodity G. Afterwards, the commodity candidate prompt section 56 classifies the illustration image and the commodity name of the registered commodity determined as the commodity candidate according to the sequence of the high similarity, and then, displays them in the commodity candidate prompt region 83 (Act S21)

The input acceptance section 57 determines whether or not the selection operation to the commodity image of the registered commodity is accepted (Act S22). If the selection is accepted (Act S22: Yes), the processing is transferred to Act S23, and the determination reporting section 55 displays the determination screen 71. On the other hand, if the selection is not accepted (Act S22: No), the processing is transferred to Act S12.

In Act S25, the CPU 161 determines the existence of the service termination carried out by utilizing the termination notification and the like of the commodity registration from the POS terminal 11. If a service is continued (Act S25: No), the CPU 161 returns the processing to Act S12 to continue the processing. If the service is terminated (Act S25; Yes), the image acquirement section 51 outputs a capturing-off signal to the image capturing unit 164 to terminate the capturing executed by the image capturing unit 164 (Act S26), so as to terminate the processing.

In above Act S24, the input of the sales number carried out via the keyboard 107 is set to be accepted, but the input method of the sales number is not patricianly limited. For instance, the time of the touch carried out on the commodity image displayed on the determination screen 71 also can be accepted as the sales number. In addition, the sales number also can be formed to be accepted in the determination screen 71.

Figure 10:
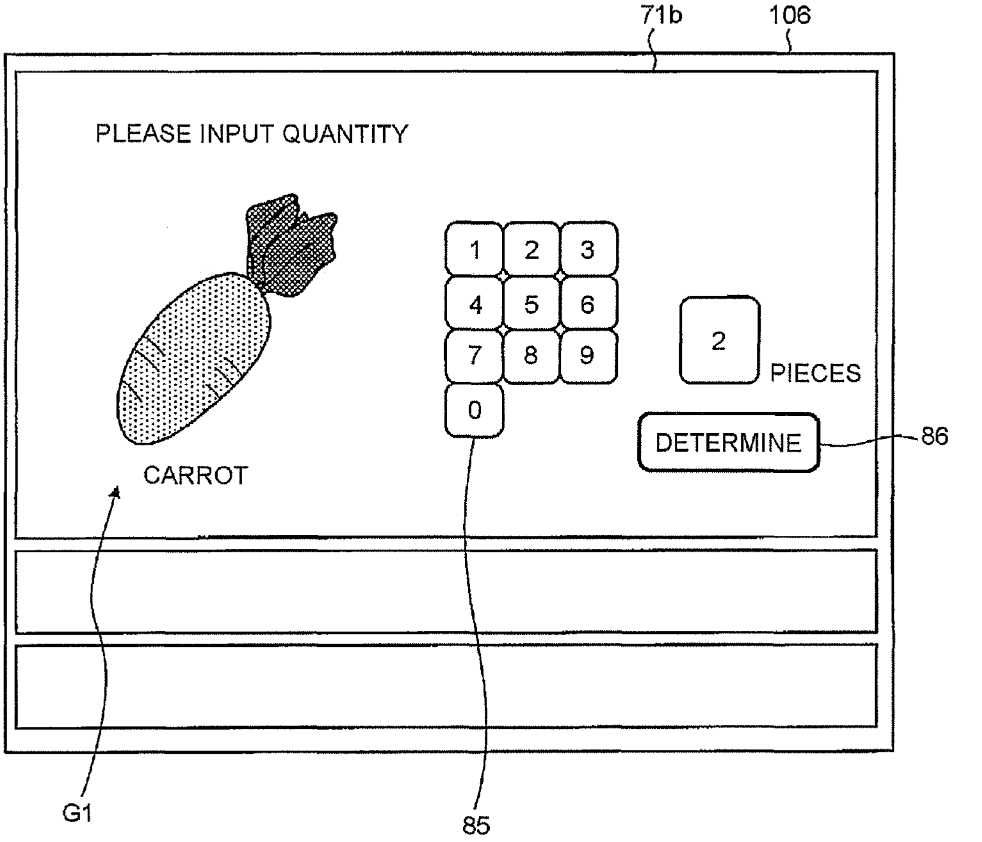
FIG. 10 is a drawing showing an example as the determination screen capable of accepting a sales number.
Figure 11:
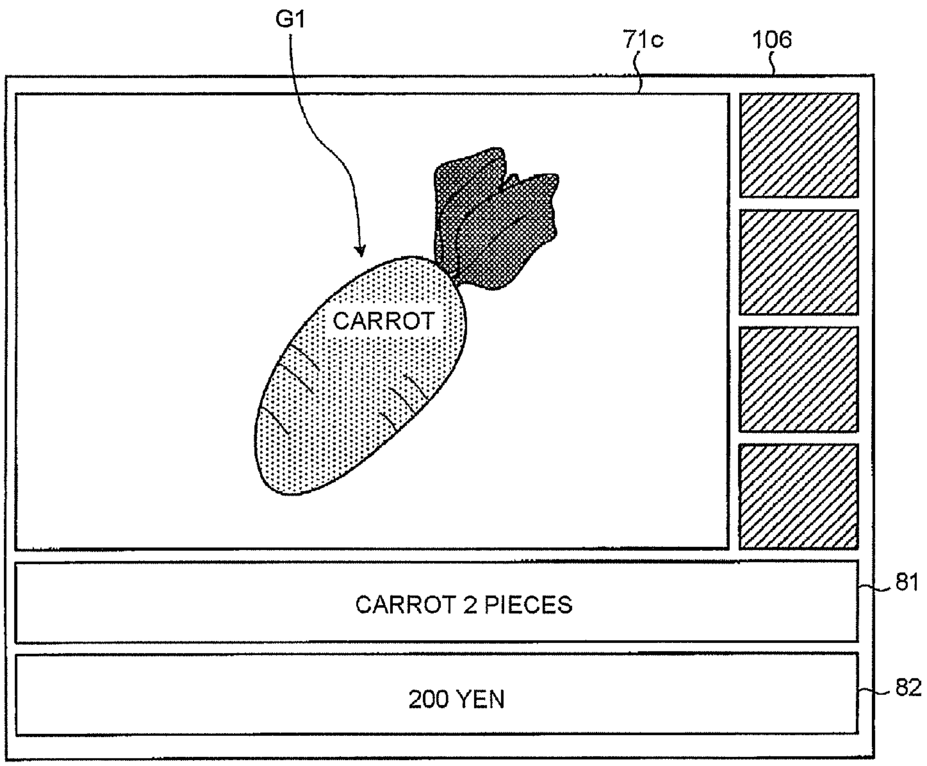
FIG. 11 is a drawing showing an example of the determination screen displaying the sales number.

FIG. 10 is a drawing showing an example of a determination screen 71*b* capable of accepting the sales number. As shown in FIG. 10, the illustration image G1 and the commodity name "carrot" of the determined commodity are displayed on the determination screen 71*b*, and moreover, the determination screen 71*b* is provided with a numerical keypad 85, so that the sales number of the commodity is formed to be capable of being input from the numerical keypad 85. When a determination button 86 is selected after the sales number is input, the input acceptance section 57 accepts the commodity ID of the determined commodity and the input of the sales number. Afterwards, as shown in FIG. 11, the determination reporting section 55 displays the commodity name and the sales number of the determined commodity together in a commodity name representation region 81 of a determination screen 71*c* and displays a total amount calculated based on the unit price and the sales number in the price display region 82.

Figure 12:
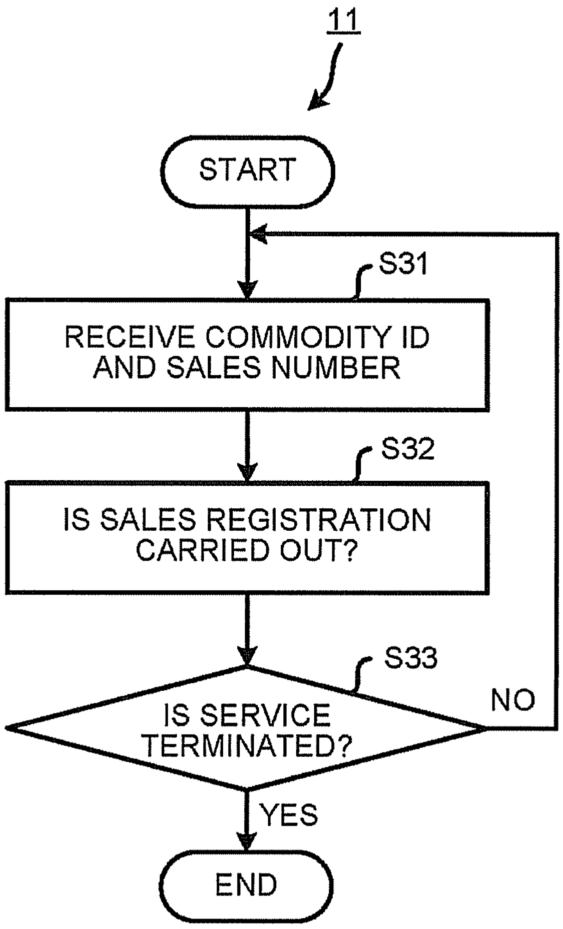
FIG. 12 is a flow chart showing the Acts of sales registration processing executed by the POS terminal.

The operation of the POS terminal 11 is described. FIG. 12 is a flow chart showing the Acts of sales registration processing executed by the POS terminal 11.

When the processing begins in response to the beginning and the like of the commodity registration based on the operation indication of the keyboard 22, the CPU 61 receives the commodity ID and the sales number of the determined commodity output by the commodity reading apparatus 101 in Act S24 in FIG. 9 (Act S31). Next, the sales registration section 611 reads out the commodity category or the unit price and the like from the PLU file F1 based on the commodity ID and the sales number received in Act S31 and registers the sale of the commodity G read by the commodity reading apparatus 101 in the sales master file (Act S32). Subsequently, the CPU 61 determines the existence of the service termination caused by the termination and the like of the sales registration based on the operation indication of the keyboard 22 (Act S33). If the service is continued (Act S33: No), the CPU 61 returns to Act S31 again to continue the processing. If the service is terminated (Act S33: Yes), the CPU 61 terminates the processing.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above embodiment, the way that the commodities G are captured one by one in the commodity reading apparatus 101 is described, but the number of the commodities G captured once is not particularly limited, and the plurality of commodities G also can be captured once. In the situation that the plurality of commodities G are captured once, the similarities of the plurality of commodities G and the images (G1, G2, G3, . . . ) of the registered commodity are respectively calculated, and a calculation result and the above threshold values are compared, so as to select the determined commodity and a candidate commodity.

The composition of each representation picture above is not limited to the examples in FIG. 5 to FIG. 8 and FIG. 10 to FIG. 11, and the form that a display region used for displaying other elements or an operation button is arranged also can be adopted.

In the above embodiment, the form that the POS terminal 11 comprises the PLU file F1 is adopted, but is not limited to that, the form that the commodity reading apparatus 101 comprises the PLU file F1 also can be adopted, and the form that an external apparatus which can be accessed by the POS terminal 11 and the commodity reading apparatus 101 comprises the PLU file F1 further can be adopted.

In the above embodiment, the commodity reading apparatus 101 is set to comprise the functions of the similarity calculation section 53 and the similarity determination section 54, but is not limited to that, and the form that the POS terminal 11 comprises the functions of the similarity calculation section 53 and the similarity determination section 54 to output the calculation result or the determine result to the commodity reading apparatus 101 also can be adopted.

In the above contents, as the plurality of threshold values, the example that the similarity is determined by four Acts via the first threshold value to the third threshold value is described, but the embodiment is not limited to that. The determination also can be carried out by more Acts by using more than three threshold values, and the determination also can be carried out by using less than two threshold values. In addition, each threshold value also can be set to be capable of being altered by a user. In addition, in the above contents, the example that the first threshold value to the third threshold value and the conditions a-c are universal for all the commodities is recited, but is not limited to that, and each threshold value or the condition also can be respectively set for each registered commodity.

In the above contents, the embodiment that the first condition is divided into two Acts of displaying the situation (condition b) of the confirmation screen 72 and displaying the situation (condition a) of the confirmation screen 72 is set, but also cannot be limited that, and the first condition is divided into a plurality of Acts. That is, when other examples are shown according to above example, the form that the commodity is also determined in the situation that the confirmation screen 72 is not displayed when any one of the conditions a and b is met also can be set, and in addition, the form whether or not the confirmation screen 72 is displayed can be set also can be set.

In the above embodiment, the component of the POS terminal 11 and the commodity reading apparatus 101 is adopted, but is not limited to that, and the component that one apparatus comprising the functions of the POS terminal 11 and the commodity reading apparatus 101 also can be available.

In addition, the programs executed by each apparatus of the above embodiment is provided by being previously installed in a storage medium (ROM or storage section) of each apparatus, but is not limited to that, and also can be provided by being stored in a computer-readable storage medium such as a CD-ROM, a floppy drive (FD), a CD-R, a DVD (Digital Versatile Disk) and the like by using a file in an installable form or an executable form. Moreover, the storage medium is not limited to a computer or a medium independent from an embedded system, and further comprises a storage medium stored or temporarily stored by downloading a program transmitted through an LAN or the Internet and the like.

In addition, the programs executed by each apparatus of the above embodiment also can be stored in the computer connected with a network such as the Internet and provided by downloading via a network route, and also can be provided or allocated by the network route such as the Internet and the like. As described above, according to the present embodiment, in the situation that the similarity of the commodities G and the reference image of each commodity meets the condition of determining the commodity captured by the image capturing unit 164 as one commodity in the commodities corresponding to the reference image, the situation that the commodity captured by the image capturing unit 164 is determined as the commodity corresponding to the reference image and meeting the condition is reported. Therefore, in the situation that the specified condition is met, even though the operator does not select the commodity from the commodity candidate, the operator also can determine the commodity corresponding to the commodity G, and therefore, the determination of the registered commodity corresponding to the commodities G can be carried out simply and effectively.

What is claimed is:

1. An information processing apparatus, comprising:

a first display control unit executed by a processor, configured to display an image captured by an image capturing section;

a first output unit executed by the processor, configured to, when a similarity indicating a degree of similarity between an image of a commodity captured by the image capturing section and a reference image of each commodity is more than or equal to a first threshold value, determine a commodity of the reference image whose similarity is more than or equal to the first threshold value as the captured commodity without causing an operator to select one commodity from a candidate of the captured commodity and output commodity recognition information corresponding to the commodity of the reference image;

a second display control unit executed by the processor, configured to, when the similarity is less than the first threshold value, display the commodity of the reference image whose similarity is less than the first threshold value as a candidate of the captured commodity;

a selection acceptance unit executed by the processor, configured to accept a selection of one commodity from the candidate; and a second output unit executed by the processor, configured to determine, in response to the selection acceptance unit accepting the selection, the selected commodity as the captured commodity and output the commodity recognition information of the selected commodity, wherein when the captured commodity is determined, the first display control unit displays an image representing the determined commodity in place of the image captured by the image capturing section.

2. The information processing apparatus according to claim 1, further comprising:

a reporting unit executed by the processor, configured to carry out sound notification on information in associate with the commodity in the situation that the captured commodity is determined.

3. The information processing apparatus according to claim 1, further comprising:

a confirmation acceptance unit executed by the processor, configured to accept the confirmation whether or not the commodity of the reference image is the captured commodity for the commodity of the reference image whose the value is more than or equal to a second threshold value less than the first threshold value.

4. The information processing apparatus according to claim 1, wherein the second display control unit displays the commodity of the reference image whose value is less than the first threshold value but more than or equal to a third threshold value less than the second threshold value as the candidate of the captured commodity.

5. The information processing apparatus according to claim 1, wherein the first output unit determines the commodity of the reference image whose the number of determinations that the value is determined to be more than or equal to the first threshold value is more than a predetermined time as the captured commodity and outputs the commodity recognition information corresponding to the commodity of the reference image.

6. An information processing apparatus, comprising:

a first display control unit executed by a processor, configured to display an image captured by a image capturing section;

a first output unit executed by the processor, configured to, when a similarity indicating a degree of similarity between an image of a commodity captured by the image capturing section and a reference image of each commodity is more than or equal to a first threshold value, determine a commodity of the reference image whose similarity is more than or equal to the first threshold value as the captured commodity without causing an operator to select one commodity from a candidate of the captured commodity and output commodity recognition information corresponding to the commodity of the reference image;

a second display control unit executed by the processor, configured to, when the similarity is less than the first threshold value, display the commodity of the reference image whose similarity is less than the first threshold value and is further more than or equal to a second threshold value less than the first threshold value as a first candidate of the captured commodity;

a confirmation acceptance unit executed by the processor, configured to accept the determination of whether or not the first candidate is the commodity;

a second output unit executed by the processor, configured to determine, in response to the confirmation acceptance unit confirming the determination, the commodity as the captured commodity and output the commodity recognition information of the commodity;

a third display control unit executed by the processor, configured to display the commodity of the reference image whose value is less than the second threshold value and is further more than or equal to a third threshold value less than the second threshold value as a candidate of the captured commodity;

a selection acceptance unit executed by the processor, configured to accept a selection of one commodity from the candidate; and a third output unit executed by the processor, configured to, in response to the selection acceptance unit accepting the selection, determine the selected commodity as the captured commodity and output the commodity recognition information of the selected commodity, wherein when the captured commodity is determined, the first display control unit displays an image representing the determined commodity in place of the image captured by the image capturing section.

7. An information processing method, comprising:

displaying an image captured by an image capturing section;

when a similarity indicating a degree of similarity between an image of a commodity captured by the image capturing section and a reference image of each commodity is more than or equal to a first threshold value, determining a commodity of the reference image whose similarity is more than or equal to the first threshold value as the captured commodity without causing an operator to select one commodity from a candidate of the captured commodity and outputting commodity recognition information corresponding to the commodity of the reference image;

when the similarity is less than the first threshold value, displaying the commodity of the reference image whose similarity is less than the first threshold value as a candidate of the captured commodity;

accepting a selection of one commodity from the candidate; and in response to the accepting, determining the selected commodity as the captured commodity and outputting the commodity recognition information of the selected commodity, wherein when the captured commodity is determined, displaying an image representing the determined commodity in place of the image captured.

* * * * *